United States Patent
Segura et al.

(10) Patent No.: US 9,547,552 B2
(45) Date of Patent: Jan. 17, 2017

(54) DATA TRACKING FOR EFFICIENT RECOVERY OF A STORAGE ARRAY

(71) Applicant: NetApp, Inc., Sunnyvale, CA (US)

(72) Inventors: Theresa L. Segura, Broomfield, CO (US); Wei Sun, Boulder, CO (US); Martin Parrish, Boulder, CO (US); Donald R. Humlicek, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 140 days.

(21) Appl. No.: 14/567,743

(22) Filed: Dec. 11, 2014

(65) Prior Publication Data

US 2016/0170833 A1    Jun. 16, 2016

(51) Int. Cl.
*G06F 11/07*    (2006.01)
*G06F 11/10*    (2006.01)
*G06F 11/20*    (2006.01)

(52) U.S. Cl.
CPC ....... *G06F 11/1088* (2013.01); *G06F 11/2058* (2013.01); *G06F 11/2069* (2013.01); *G06F 2211/1009* (2013.01)

(58) Field of Classification Search
CPC .................................................. G06F 11/1088
USPC ........................................ 714/6.13, 6.2, 6.22
See application file for complete search history.

(56) References Cited

U.S. PATENT DOCUMENTS

| | | | | |
|---|---|---|---|---|
| 6,571,324 B1* | 5/2003 | Elkington | ............... | G11C 29/74 711/120 |
| 6,973,537 B1* | 12/2005 | Kowalchik | ......... | G06F 12/0866 711/113 |
| 8,694,724 B1* | 4/2014 | Linnell | ............... | G06F 11/2082 711/113 |
| 2005/0102552 A1* | 5/2005 | Horn | ................... | G06F 11/1092 714/6.22 |
| 2006/0077734 A1* | 4/2006 | Fong | ..................... | G11C 29/76 365/200 |
| 2006/0095659 A1* | 5/2006 | New | ..................... | G06F 3/0614 711/112 |
| 2006/0206752 A1* | 9/2006 | Ikeuchi | ............... | G06F 11/1076 714/6.22 |
| 2010/0306449 A1* | 12/2010 | Berke | ................. | G06F 11/1441 711/103 |

(Continued)

OTHER PUBLICATIONS

Linux Raid Wiki, "Write-Intent Bitmap", https://raid.wiki.kernel.org/index.php/Write-intent_bitmap, Mar. 21, 2011, 3 pgs.

*Primary Examiner* — Chae Ko
(74) *Attorney, Agent, or Firm* — Haynes and Boone, LLP (57) ABSTRACT

A system and method for maintaining operation of a storage array with one or more failed storage devices and for quickly recovering when failing devices are replaced are provided. In some embodiments, the method includes receiving a data transaction directed to a volume and determining that a storage device associated with the volume is inoperable. In response to determining that the storage device is inoperable, a data extent is recorded in a change log in a storage controller cache. The data extent is associated with the data transaction and allocated to the storage device that is inoperable. The data transaction is performed using at least one other storage device associated with the volume, and data allocated to the storage device is subsequently reconstructed using the recorded data extent.

21 Claims, 10 Drawing Sheets

(56) References Cited

U.S. PATENT DOCUMENTS

| | | | |
|---|---|---|---|
| 2010/0325339 A1* | 12/2010 | Ogawa | G06F 3/061 |
| | | | 711/103 |
| 2012/0317562 A1* | 12/2012 | Wang | G06F 8/65 |
| | | | 717/170 |
| 2013/0205097 A1* | 8/2013 | Flynn | G06F 12/0246 |
| | | | 711/142 |
| 2013/0246707 A1* | 9/2013 | Bourbonnais | G06F 11/1076 |
| | | | 711/114 |
| 2014/0075240 A1* | 3/2014 | Maeda | G06F 11/2069 |
| | | | 714/6.23 |
| 2014/0089730 A1* | 3/2014 | Watanabe | G06F 11/1092 |
| | | | 714/6.22 |
| 2014/0215262 A1* | 7/2014 | Li | G06F 11/0727 |
| | | | 714/6.21 |
| 2014/0258612 A1* | 9/2014 | Kalwitz | G06F 3/0619 |
| | | | 711/114 |
| 2014/0281682 A1* | 9/2014 | Manohar | G11C 29/52 |
| | | | 714/6.11 |
| 2014/0337609 A1* | 11/2014 | Steele | G06F 9/4401 |
| | | | 713/2 |

* cited by examiner

| Modified Data Extents | Corresponding Data/Metadata |
|---|---|
| 01000-01999 | 01011... |
| 03000-03999 | 01111... |
| 04000-04999 | 00001... |
| 06000-06999 | 11010... |

Figure 4B

| Data Extent | 00000-00999 | 01000-01999 | 02000-02999 | 03000-03999 | 04000-04999 | 05000-05999 | 06000-06999 | 07000-07999 | ... |
|---|---|---|---|---|---|---|---|---|---|
| Modified? | N | Y | N | Y | Y | N | Y | N | ... |

Figure 10

DATA TRACKING FOR EFFICIENT RECOVERY OF A STORAGE ARRAY

TECHNICAL FIELD

The present description relates to data storage and to maintaining and restoring functionality when a storage device is replaced or rebooted.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput.

In view of these trends, there is a tendency to group this data into increasingly larger volumes (logical partitions) spanning multiple drives. However, larger volumes place more data at risk should one of the underlying storage devices fail. Even though storage devices have become more reliable, they are not infallible. To reduce the risk of data loss in the event hardware becomes inaccessible, RAID (Redundant Array of Independent/Inexpensive disks) and other groupings offer redundancy protection such as parity or mirroring. Data lost due to a failed device can be recovered from the parity or mirrored data provided a sufficient number of devices within the group are still functional.

In architectures that offer redundancy, the group or array may continue to function even with one or more inaccessible devices. However, there is no guarantee that changes to the data will be written to the inaccessible devices. Thus, even if an inaccessible device comes back online, it may be out of sync with the remainder of the group. One solution is to reconstruct the entire dataset of the now-accessible device and to store a clean copy on the device. This is a non-trivial task, and in some applications, a rebuild in this manner can take hours or days. Accordingly, while existing techniques for maintaining a group of storage devices have been generally adequate, the techniques described herein dramatically reduce rebuild time, provide improved write performance in the event of a device failure, and do so with less burden on the storage system.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and computer programs for tracking writes to a volume when an associated storage device is inoperable. If the inoperable storage device comes back online without any data loss, a selective rebuild may be performed that only reconstructs and stores the changed portions of the data set. In an exemplary embodiment, a storage controller of a storage system receives a data transaction directed to a volume and determines whether all of the storage devices associated with the volume are in an operable state. If not, the storage controller determines whether enough storage devices are operable to perform the data transaction with reduced redundancy. If some of the storage devices are inoperable but enough are functional to carry out the data transaction, the storage controller creates a change log and records any modified data extents in the change log. The storage controller performs the transaction and notifies the sender that the transaction is complete. The notification may also indicate that the group has some failed devices and may be operating with reduced redundancy.

When a storage device is added to a group having some failed devices, the storage controller may determine whether a partial rebuild is possible. For example, in some instances, the storage controller determines that the device being added is a previously unresponsive device that is now operational again. This is often the case when a device is rebooted or taken offline for maintenance. In some instances, the storage controller verifies that the data on the added storage device matches that of the inoperable device. For example, this often occurs when a device is rebooted or when a failing device is copied to a fresh device. If it is determined that the data matches the last known data of the inoperable device, a partial rebuild using the change log may be performed. To do so, the storage controller recovers the data corresponding to the extents recorded in the change log using parity data, mirrored data, or other recovery techniques and writes only this modified data to the added storage device. This avoids the need for a full rebuild of the entire volume, dramatically reducing the amount of time that the group is operating with reduced performance.

To avoid burdening the group of storage devices with maintaining the change log, the storage controller may store the change log in one or more controller caches. In some embodiments, the storage system takes advantage of background routines that replicate data in a controller cache across controllers to provide redundancy and safeguard the change log. Storing multiple copies at multiple storage controllers may also streamline changes in volume ownership. In these examples and others, the techniques of the present disclosure provide a safe and robust mechanism for quickly recovering from a failed device without unnecessarily recreating data.

Figure 1:
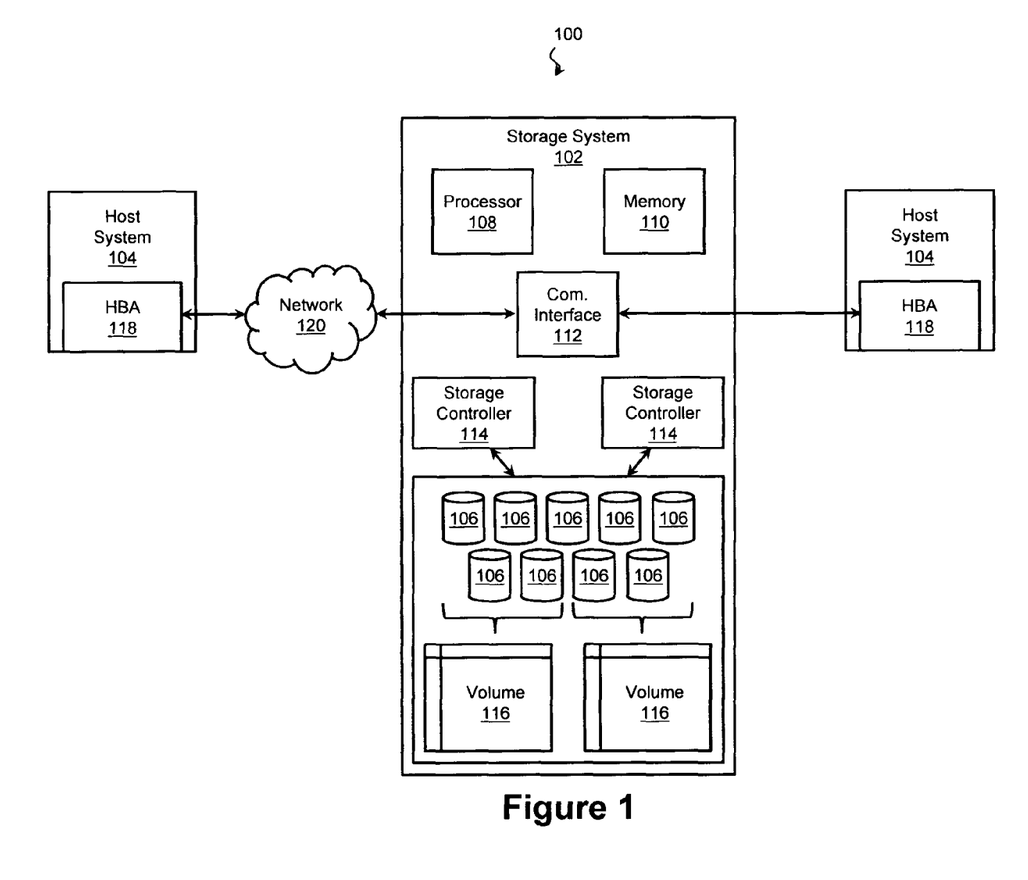
FIG. 1 is a schematic diagram of a computing architecture according to aspects of the present disclosure.

FIG. 1 is a schematic diagram of a computing architecture 100 according to aspects of the present disclosure. The computing architecture 100 includes a number of computing systems, including one or more storage systems 102 and one or more host systems 104 (hosts), each of which may store and manipulate data. Techniques for continuing operation when a storage device becomes inaccessible and for quickly recovering should the storage device return are described with reference to the figures that follow.

In the illustrated embodiment, the computing architecture 100 includes one or more storage systems 102 in communication with one or more hosts 104. It is understood that for clarity and ease of explanation, only a single storage system 102 and a limited number of hosts 104 are illustrated, although the computing architecture 100 may include any number of hosts 104 in communication with any number of storage systems 102. An exemplary storage system 102 receives data transactions (e.g., requests to read and/or write data) from the hosts 104 and takes an action such as reading, writing, or otherwise accessing the requested data so that storage devices 106 of the storage system 102 appear to be directly connected (local) to the hosts 104. This allows an application running on a host 104 to issue transactions directed to storage devices 106 of the storage system 102 and thereby access data on the storage system 102 as easily as it can access data on the storage devices 106 of the host 104. In that regard, the storage devices 106 of the storage system 102 and the hosts 104 may include hard disk drives (HDDs), solid state drives (SSDs), RAM drives, optical drives, and/or any other suitable volatile or non-volatile data storage medium.

While the storage system 102 and the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor 108 such as a microcontroller or a central processing unit (CPU) operable to perform various computing instructions. The computing system may also include a memory device 110 such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface 112 such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 in communication with one or more storage controllers 114. The storage controllers 114 exercise low-level control over the storage devices 106 in order to execute (perform) data transactions on behalf of the hosts 104, and in so doing, may group the storage devices for speed and/or redundancy using a virtualization technique such as RAID (Redundant Array of Independent/Inexpensive Disks). At a high level, virtualization includes mapping physical addresses of the storage devices into a virtual address space and presenting the virtual address space to the hosts 104. In this way, the storage system 102 represents the group of devices as a single device, often referred to as a volume 116. Thus, a host 104 can access the volume 116 without concern for how it is distributed among the underlying storage devices 106.

Turning now to the hosts 104, a host 104 includes any computing resource that is operable to exchange data with a storage system 102 by providing (initiating) data transactions to the storage system 102. In an exemplary embodiment, a host 104 includes a host bus adapter (HBA) 118 in communication with a storage controller 114 of the storage system 102. The HBA 118 provides an interface for communicating with the storage controller 114, and in that regard, may conform to any suitable hardware and/or software protocol. In various embodiments, the HBAs 118 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 118 are coupled to the storage system 102 via a network 120, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 118 of a host 104 sends one or more data transactions to the storage system 102 via the network 120. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information. The storage system 102 receives the data transactions and carries out the associated action using the storage devices 106 on behalf of the host 104.

During the operation of the storage system 102, a storage device 106 may become inoperable (i.e., unable to perform data transactions). For example, a storage device 106 may be rebooted during a maintenance operation, may be removed from the storage system 102, or may experience a hardware or software glitch. If data in a volume 116 is modified while one of the underlying storage devices 106 is inoperable, the integrity of the data on the offline storage device 106 cannot be guaranteed. In other words, even if the data previously stored on the storage device 106 is not lost, if the inoperable storage device 106 does not keep up with subsequent changes, the data set on the storage device 106 will be out of sync. A technique for tracking data transactions performed while a storage device 106 is inoperable and for quickly synchronizing an inoperable storage device 106 when it is restored is described with reference to FIGS. 2-5.

Figure 2:
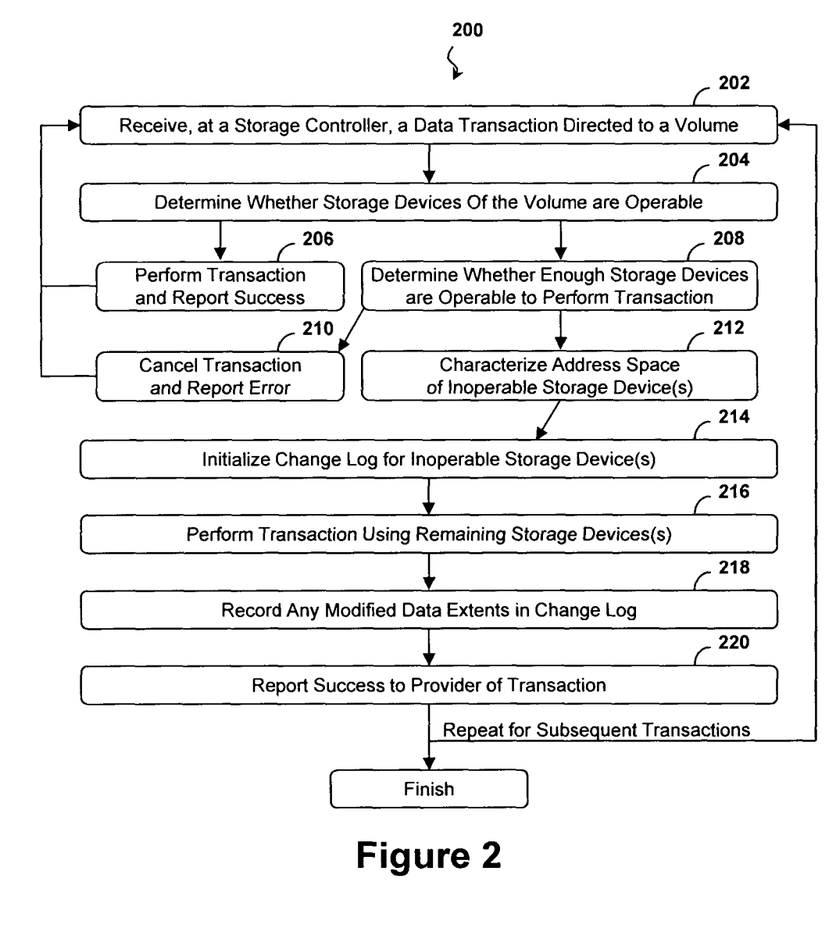
FIG. 2 is a flow diagram of a method of write tracking according to aspects of the present disclosure.
Figure 3:
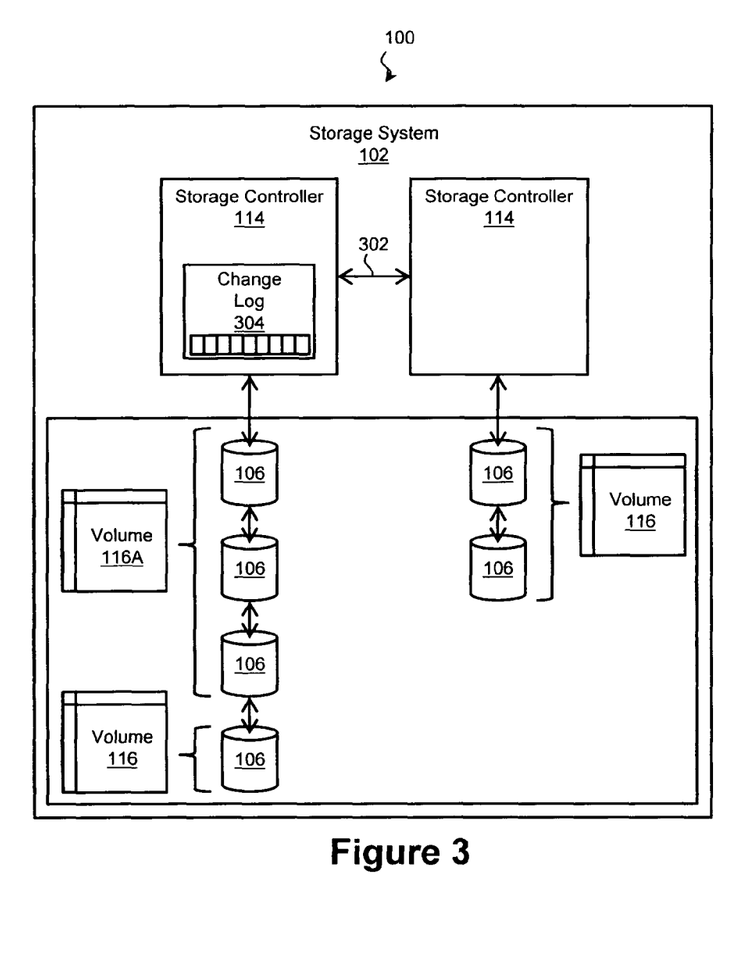
FIG. 3 is a schematic diagram of a computing architecture performing the method of write tracking according to aspects of the present disclosure.
Figure 4A:
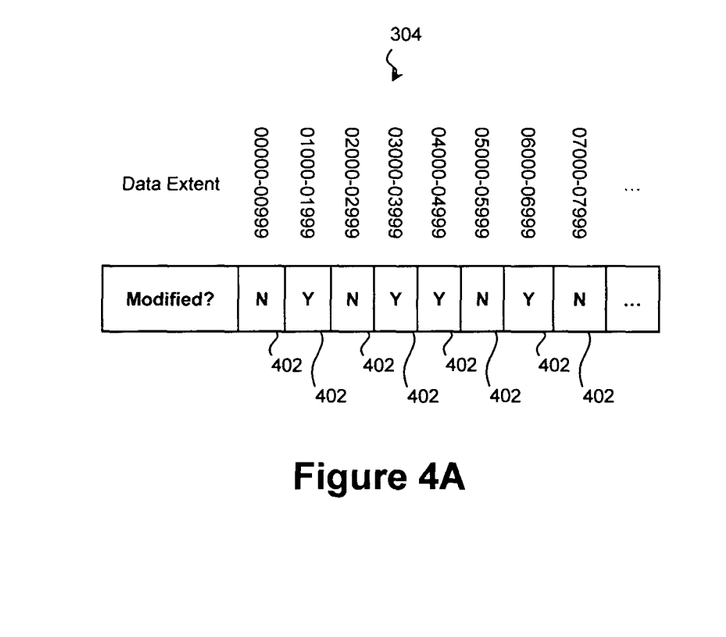
FIGS. 4A and 4B are memory diagrams of change logs suitable for use in the method of write tracking according to aspects of the present disclosure.
Figure 4B:
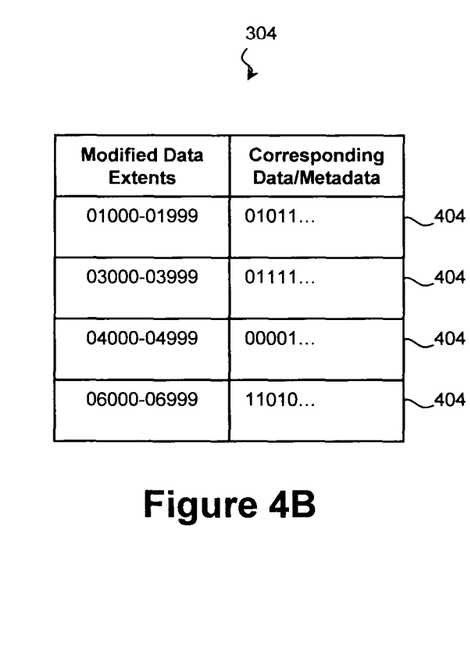
Figure 5:
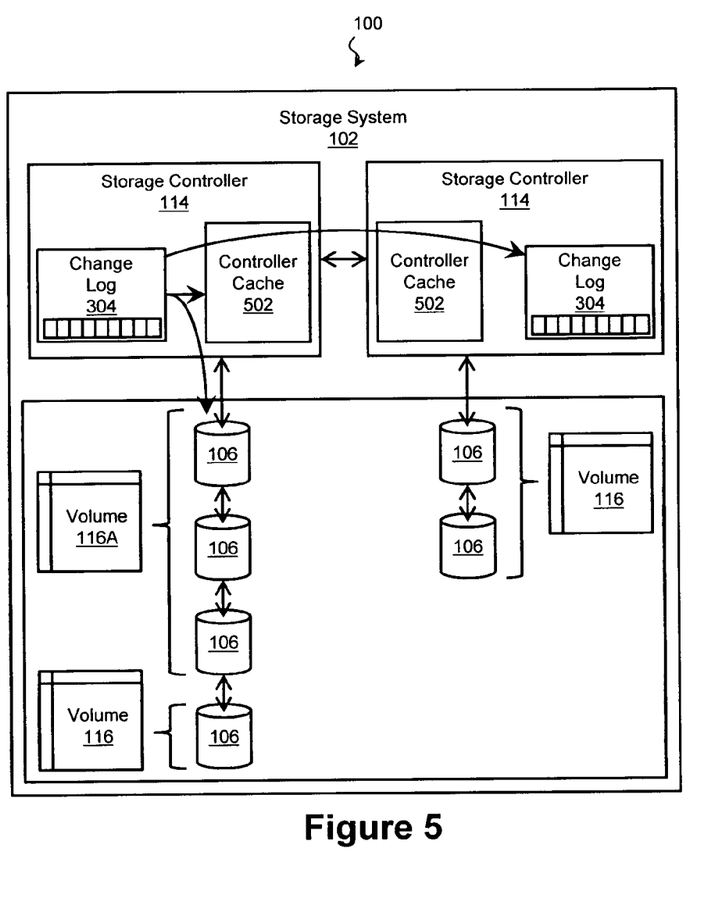
FIG. 5 is a further schematic diagram of the computing architecture performing the method of write tracking according to aspects of the present disclosure.

FIG. 2 is a flow diagram of a method 200 of write tracking according to aspects of the present disclosure. It is understood that additional steps can be provided before, during, and after the steps of method 200, and that some of the steps described can be replaced or eliminated for other embodiments of the method 200. FIGS. 3 and 5 are schematic diagrams of a computing architecture performing the method 200 according to aspects of the present disclosure. The computing architecture may be substantially similar to the computing architecture 100 of FIG. 1. For example, it may contain a storage system 102 substantially similar to that described with reference to FIG. 1. Accordingly, in the interest of brevity, some elements will not be repeated. FIGS. 4A and 4B are memory diagrams of change logs suitable for use in the method 200 according to aspects of the present disclosure.

Referring to block 202 and to FIG. 3, a data transaction directed to data in a target volume 116 is received at a storage controller 114 of a storage system 102. In the example of FIG. 3, the exemplary data transaction is directed to target volume 116A. The data transaction may be received from a process running on a host 104, on the storage system 102, and/or on any other computing system.

In some embodiments, one or more storage controllers 114 of the storage system 102 may be designated as the owner(s) of the target volume 116A. Regarding ownership, in some examples, the storage controllers 114 of the storage system 102 are arranged in a redundant manner where a single storage controller 114 is designated as the owner of a volume 116. In these examples, to avoid data collisions, only the storage controller 114 that has ownership of a volume 116 may directly read to or write from a volume 116. To provide redundancy, should the owning storage controller 114 become overburdened or fail, ownership may be transferred to the other storage controllers 114 of the storage system 102. The non-owning storage controllers 114 may support the owning controller by forwarding received data transactions to the owning storage controller 114 via an inter-controller bus 302 instead of performing the transactions directly. Accordingly, in block 202, the data transaction may be received at the owning storage controller 114 directly or via a transfer from another storage controller 114 by a channel such as an inter-controller bus 302. In the embodiment of FIG. 3, each storage controller 114 has ownership of those volumes 116 shown as directly connected to the controller 114.

Referring to block 204, the storage controller 114 identifies the storage devices 106 of the target volume 116A and determines whether the storage devices 106 are operable to perform the data transaction. Determining whether a particular storage device 106 is operable may include determining whether it is present, whether it has power, whether it is correctly connected to the storage system 102, whether it is capable of receiving communications, and/or whether it is operating a mode that allows it to perform the transaction (e.g., a storage device may be in a read-only mode and unable to perform a write transaction). The determination may also include any other determination that may weigh on the ability of the storage device 106 to attempt or complete the data transaction. The determination may include a separate polling step where the storage controller 114 requests status from the storage device 106. Additionally or in the alternative, the storage controller 114 determines whether a storage device 106 is operable by attempting to perform the data transaction and monitoring for a response from the storage device 106 indicating whether its portion of the transaction completed successfully. For example, the storage controller 114 may receive a response from the storage device 106 indicating an error status such as a Busy or Not Ready response. In another example, the storage device 106 may set a timer when the data transaction is attempted. If the timer expires before a response is received, the storage controller 114 infers that the storage device 106 is inoperable.

In some embodiments, a previous iteration of the method 200 will have set an "inoperable" flag corresponding to a particular storage device 106. Accordingly, the determination of whether the storage devices are operable may include checking the status of one or more "inoperable" flags. Consequently, upon determining that a storage device 106 is not operable, the storage controller 114 may set a corresponding "inoperable" flag.

If all of the storage devices 106 of the target volume 116A are operable to perform the transaction, the technique proceeds to block 206 where the storage controller 114 performs the data transaction (if it is not completed in block 204) and reports the success to the provider of the data transaction. This may include providing data read from the storage devices 106 and/or providing an indicator of a successful write.

Referring to block 208, if it is determined in block 204 that some of the storage devices 106 are not able to perform their portions of the data transaction, the storage controller 114 determines whether enough storage devices 106 are operable to perform the data transaction, albeit with reduced redundancy. Redundancy may include parity and/or mirroring, and in an example where the storage devices 106 mirror data (e.g., RAID 1, RAID 10, etc.), the determination of block 208 includes determining whether at least one of the mirrored storage device 106 involved in the data transaction is operable. If so, then the transaction can be completed using the operable storage device 106 and the data can be mirrored later as described in more detail below.

In an example where the volume 116 uses a parity redundancy scheme (e.g., RAID 5, RAID 6, etc.), the determination of block 208 includes determining whether sufficient storage devices 106 are operable to reconstruct the data using the parity information. For example, RAID 5 supports a degraded mode when one storage device 106 of the volume 116 is inoperable, and RAID 6 supports a degraded mode when one or two storage devices 106 of the volume 116 are inoperable. In degraded mode, enough of the data and parity information is available on the storage devices 106 to access the entire address space of the volume 116, although doing so may entail reconstructing some data using the parity information. To read data in degraded mode, the parity information is used to reconstruct any data stored on an inoperable storage device 106. If the inoperable storage device(s) 106 only contained parity data, no reconstruction may be needed. To write data in a degraded mode, a combination of data and parity information is written to the operable storage devices 106. The portion of the data and/or parity information to be written to the inoperable storage device 106 may be postponed until functionality is restored, and a suitable rebuild process is described in detail below.

Referring to block 210, if it is determined in block 208 that there are not enough operable storage devices 106 of the volume 116 to perform the data transaction even with reduced redundancy, then the storage controller 114 may cancel the data transaction at the operable storage devices 106 and may report an error to the transaction provider.

Referring to block 212, if it is determined in block 208 that enough of the storage devices 106 are operable to perform the data transaction with reduced redundancy, the storage controller 114 identifies and characterizes the address space stored by the inoperable storage device(s) 106. The characterization is used to track modifications to data in the address space so that if the inoperable storage device(s) 106 become operable, the modified portions of the data set can be selectively reconstructed.

Referring to block 214, the storage controller 114 initializes a change log 304 for tracking the address space of the inoperable storage device(s) 106 if one has not already been initialized. The change log 304 contains entries recording whether data associated with the address space has been modified since the inoperable storage device(s) became inoperable. In its initial state, the change log 304 records that no data has been modified. However, as subsequent data transactions are performed, the change log 304 records the modified address ranges (modified extents) and/or the respective data so that the data can be written to the inoperable storage device(s) 106 should they come back online. The change log 304 may take the form of bitmap, a hash table, a flat file, an associative array, a linked list, a tree, a state table, a relational database, and/or other suitable memory structure. The change log 304 may divide the address space according to any granularity, and in various exemplary embodiments divides the address space into 1 kB, 4 kB, 64 kB, 128 kB, and/or 1 MB address ranges (extents). In some embodiments, the change log 304 divides the address space according to the "segment size" attribute of the RAID configuration associated with the address space or a multiple thereof. As some RAID implementations address data by stripe, which corresponds to one "segment" per storage device in the RAID group (excluding parity devices), in some such embodiments, the change log 304 uses extents of 1 stripe.

An exemplary change log 304 is illustrated in FIG. 4A. The exemplary change log 304 is structured as a bitmap with each data extent of the address space having an associated entry 402. Each entry 402 records whether the data within the corresponding extent has been modified since the storage device 106 became inoperable. A further exemplary change log 304 is illustrated in illustrated in FIG. 4B. The change log 304 of FIG. 4B is structured as a sorted list of those data extents that have been modified since the storage device 106 became inoperable. In the illustrated embodiment, each entry 404 of the change log 304 includes the data extent and the respective data values and/or metadata to be stored there. It is understood that these arrangements of the change log 304 are merely exemplary, and other formats for the change log 304 are both contemplated and provided for.

Referring to FIG. 5, the storage controller 114 may store the change log 304 to any storage device 106 including the remaining storage devices 106 of the volume 116A. However, the group may already be burdened by the loss of the inoperable storage devices 106, and accessing a change log 304 before each write may effectively double the transaction load on the storage devices 106 and their interface with the storage controller 114. Accordingly, in some embodiments, the storage controller 114 stores the change log 304 to a controller cache 502. Doing so may reduce the burden on the storage devices 106 and the interface, and because it is typically faster to read from and write to the controller cache 502, storing the change log 304 in the cache 502 may reduce transaction latency. Moreover, in some embodiments, the controller cache 502 is mirrored across storage controllers 114. In these embodiments and others, the change log 304 is copied to other storage controllers 114 for storing in their respective controller caches 502 for redundancy. The redundant copy allows the change log 304 to be restored if lost or corrupted and may simplify the handoff of volume ownership to a storage controller 114 that already has an up-to-date copy of the change log 304.

Referring to block 216 of FIG. 2 and referring still to FIG. 5, the storage controller 114 performs the data transaction using the operable storage devices 106. This may include reading and/or writing data stored by the operable storage devices 106. Referring to block 218, the storage controller 114 records any data modified by the data transaction that falls within the address space of the inoperable storage device(s) 106 in the change log 304. The storage controller 114 may record the affected address ranges in the change log 304, and may also record the data, metadata, and/or parity information to be written to the inoperable storage device(s) 106. Any changes to the change log 304 may be mirrored to other copies such as those in caches 502 of other storage controllers 114. In some embodiments, a background process recognizes the changes to data in a controller cache 502 including changes to the change log 304 and, to alleviate congestion on the inter-controller bus 302, transmits only the changed portions to the other storage controllers 114.

Referring to block 220, the storage controller 114 reports the results of the data transaction to the transaction provider. This may include providing data read from the storage devices 106 and/or providing an indicator of a successful write. In some embodiments, the storage controller 114 informs the transaction provider that the data transaction was performed, but that the data may not be protected by the intended amount of redundancy. The technique of blocks 202-220 may be repeated for subsequent data transactions. In subsequent iterations, some processes (e.g., characterizing the address space in block 212, initializing the change log 304 in block 214, etc.) may be skipped if the inoperable storage devices 106 have not changed.

There are a number of advantages to performing transaction logging using a storage controller 114. First, as mentioned above, the storage controller 114 can take advantage of the fast access speed of the controller cache 502 to improve read and write latency for the change log. Additionally, the storage controller 114 can take advantage of controller cache mirroring to maintain redundant copies in the various controllers. Furthermore, because the change log 304 can be initialized as soon as an inoperable storage device is detected, change logging can be performed only when needed. In other words, it is not necessary to predict when a storage device 106 might fail or to suffer any performance impact associated with the change logging if no devices have failed. Of course, these advantages are merely exemplary and no advantage is required for any one embodiment.

Figure 6:
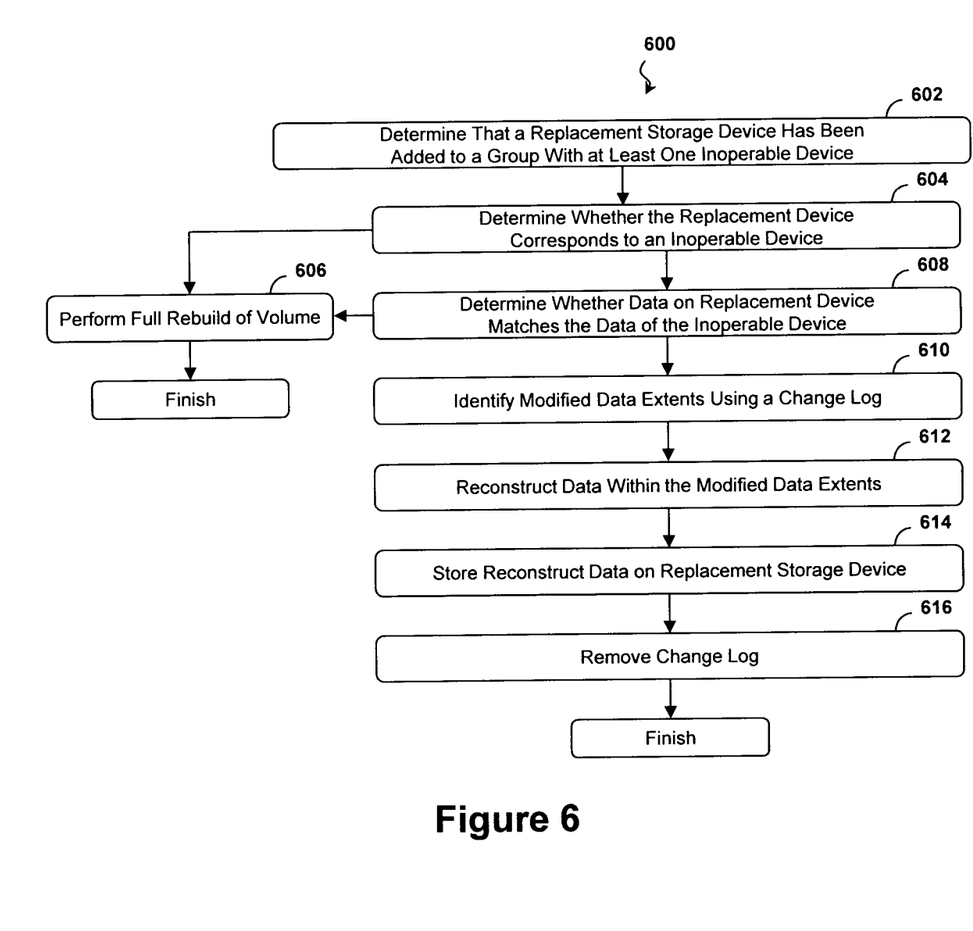
FIG. 6 is a flow diagram of a method of rebuilding a volume according to aspects of the present disclosure.
Figure 7:
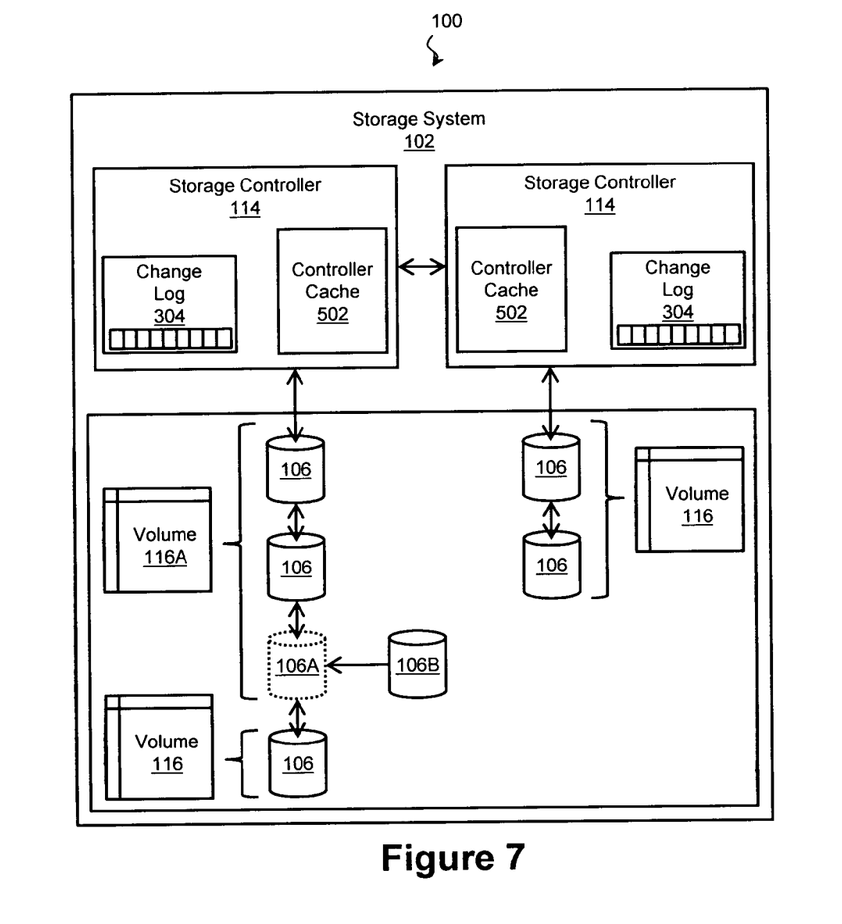
FIG. 7 is a schematic diagram of a computing architecture performing the method of rebuilding a volume according to aspects of the present disclosure.

The storage system 102 may continue to perform transactions using reduced redundancy and to log the transactions using the change log 304 until a replacement storage device 106 is added to the group. When the replacement storage device 106 is recognized by the storage system 102, the device may be initialized and the volume 116 may be rebuilt. Depending on the data already stored on the replacement storage device 106, it may be possible to use the change log 304 rebuild the volume 116 by writing only the data that changed rather than the entire portion of the volume 116 assigned to the storage device 106. A technique for rebuilding a volume 116 suitable for use as part of method 200 is described with reference to FIGS. 6 and 7. FIG. 6 is a flow diagram of a method 600 of rebuilding a volume according to aspects of the present disclosure. It is understood that additional steps can be provided before, during, and after the steps of method 600, and that some of the steps described can be replaced or eliminated for other embodiments of the method 600. FIG. 7 is a schematic diagram of a computing architecture performing the method 600 according to aspects of the present disclosure. The computing architecture 100 may be substantially similar to the computing architecture 100 of FIGS. 1, 3 and 5, and in the interest of brevity, some elements will not be repeated.

Referring first to block 602 of FIG. 6 and to FIG. 7, a storage controller 114 of a storage system 102 determines that a replacement storage device 106 has been added to a device group having one or more inoperable storage devices 106. In many examples, the storage controller 114 that makes the determination is also the owner of the respective volume 116. Referring to FIG. 7, the inoperable storage device is labeled device 106A, and the replacement storage device is labeled device 106B. Both the inoperable storage device 106A and the replacement storage device 106B are part of a group corresponding to data volume 116A.

Referring to block 604 of FIG. 6, the storage controller 114 determines which of the inoperable storage devices the replacement storage device 106B corresponds to, particularly if there is more than one inoperable storage device 106. This may include comparing a device ID (e.g., a World Wide Name or other identifier) of the replacement storage device 106B to determine if it matches or is similar to a device ID of an inoperable storage device 106A. In many applications, the replacement storage device 106A is the same storage device 106 that became inoperable but has since recovered. For example, the replacement storage device 106A may have been rebooted, may have temporarily lost connection, may have temporarily stopped responding due to a glitch, etc. In other applications, the replacement storage device 106 may be a different storage device 106 entirely. Additionally or in the alternative, the determination of which inoperable device a replacement device corresponds to may also include comparing a hash of data stored on the replacement storage device 106B to determine if it matches or is similar to a hash of data that was stored on an inoperable storage device 106A.

If the replacement storage device 106B does not correspond to any of the inoperable storage devices 106A, a full rebuild of the volume 116 may be performed in block 606. In a full rebuild, the entire address space of the replacement storage device 106B is reconstructed by reading the data, metadata, and/or parity information of the other storage devices 106 in the group. As it is reconstructed, the data is written to the replacement storage device 106B. The storage controller 114 may track the portion of the address space that has been reconstructed so that the replacement storage device 106B can be used to respond to some data transactions while the volume 116 is being rebuilt.

Referring to block 608, if a correspondence is determined in block 606, the storage controller 114 determines whether the data on the replacement storage device 106B matches the dataset stored on the inoperable storage device 106A at the time it became inoperable. In various examples, this may occur when the replacement storage device 106B is the same as the (previously) inoperable storage device 106A and/or when the data on the inoperable device was copied to the replacement storage device 106B. If the data on the replacement storage device 106B does not match the dataset of the corresponding inoperable storage device 106A, a full rebuild of the volume 116 may be performed in block 606. In some embodiments, if the inoperable storage device 106A has been inactive for more than a threshold amount of time, the storage controller 114 assumes that the data on the replacement storage devices 106B does not match.

If the data on the replacement storage device 106B does match the dataset of the corresponding inoperable storage device 106A, a partial or selective rebuild may be performed. Referring to block 610, in an exemplary partial rebuild, the storage controller 114 identifies those data extents that were modified while the inoperable storage device 106A was inoperable using the change log 304. Referring to block 612, the storage controller 114 reconstructs or otherwise determines the data (including metadata) values to be stored at the data extents in the change logs. In some embodiments, the data values are stored in the change log 304 and are determined therefrom. In some embodiments, data and/or parity data is read from the other storage devices 106 of the volume 116 to recreate the data values (including parity values) to be written to the replacement storage device 106B. Referring to block 614, the data values are stored to the replacement device 106B. As this is in progress, the storage controller 114 may track those data extents for which data values have been written. In one such embodiment, the storage controller 114 tracks rebuilt extents by updating the change log 304 entries to record those extents whose data has been recreated and stored. In a further embodiment, the storage controller 114 maintains a separate log of rebuilt data. In yet a further embodiment where data is rebuilt sequentially, the storage controller 114 tracks a reconstruction boundary representing the largest address that has been reconstructed or vice versa. By tracking reconstructed data, if subsequent transactions read from or written to the extents that have rebuilt, the replacement device 106B can be used to service the transaction even if the rebuilding is still ongoing. Examples of this are described in more detail below. Referring to block 616, upon completion of the rebuild process, the storage controller 114 may remove the change log 304.

Figure 8:
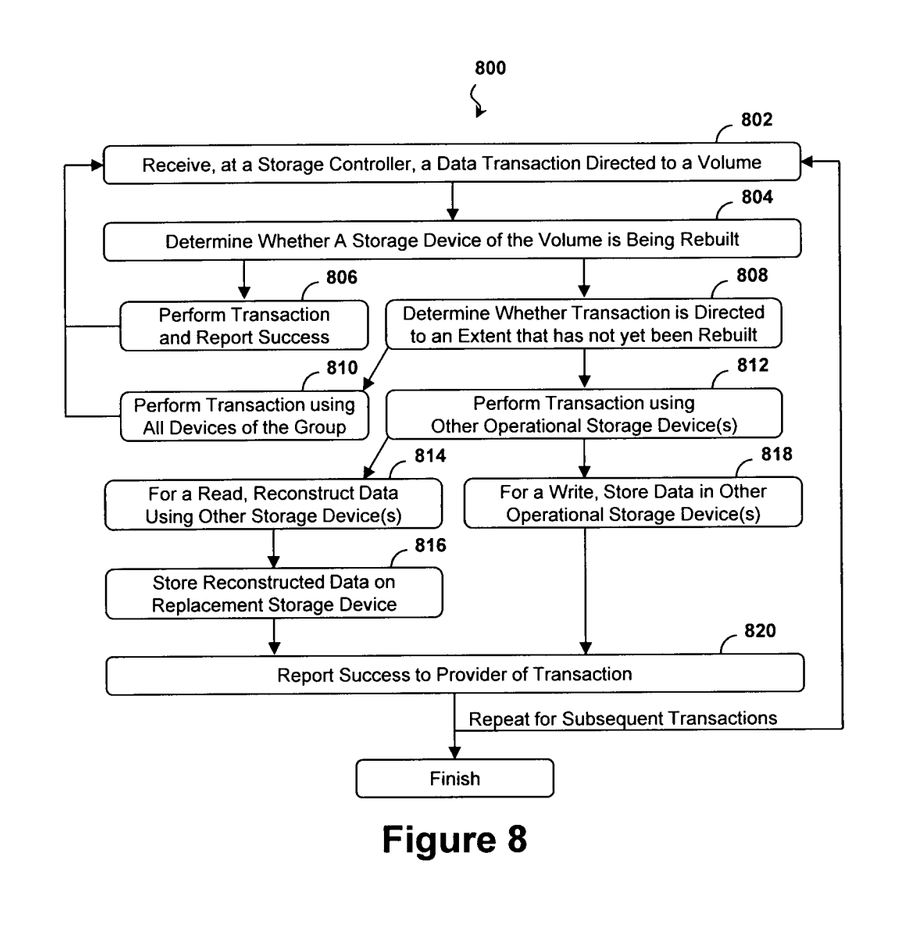
FIG. 8 is a flow diagram of a method of performing data transactions while a volume is being rebuilt according to aspects of the present disclosure.

As described above, the storage system 102 may continue to service transactions using the replacement storage device 106B during either a full or a partial rebuild. An exemplary routine is described with reference to FIG. 8. FIG. 8 is a flow diagram of a method 800 of performing data transactions while a volume is being rebuilt according to aspects of the present disclosure. It is understood that additional steps can be provided before, during, and after the steps of method 800, and that some of the steps described can be replaced or eliminated for other embodiments of the method 800. The method is suitable for performing by a suitable storage environment 100 including the storage environments of FIGS. 1, 3, 5, and/or 7 and may be performed during any suitable rebuilding process including the process of method 600.

Referring to block 802, a storage controller 114 of a storage system 102 receives a data transaction substantially as described in block 202 of FIG. 2. The data transaction is directed to a target volume. Referring to block 804 of FIG. 8, the storage controller 114 determines whether a storage device 106 of the volume 116 is being rebuilt. If not, referring to block 806, the transaction is performed and a successful completion is reported to the transaction provider substantially as described in block 206 of FIG. 2. This may include providing data read from the storage devices 106 and/or providing an indicator of a successful write.

Referring to block 808 of FIG. 8, if the storage controller 114 determines that at least one storage device 106 is being rebuilt, the storage controller 114 determines whether the data transaction is directed to a data extent that was modified and has not yet been rebuilt. As described above, in some embodiments, the change log 304 records data extents that have been modified and may also be used to identify those data extents that have been rebuilt. Accordingly, the storage controller 114 may determine from the change log 304 whether the data transaction is directed to a modified data extent that has not yet been rebuilt. In some embodiments, the storage controller 114 records a reconstruction boundary and determines from the reconstruction boundary whether the data transaction is directed to a modified data extent that has not yet been rebuilt.

Referring to block 810 of FIG. 8, if the data transaction is directed to a data extent that is up to date on the replacement storage device 106B (e.g., not modified, modified but since reconstructed and stored, etc.), the storage controller 114 performs the data transaction by reading and/or writing data to the replacement storage device 106B and to the other operable storage devices of the group.

On the other hand, if the data transaction is directed to a modified data extent that has not yet been reconstructed, referring to block 812, the storage controller 114 performs the data transaction by reading and/or writing data to the other operable storage devices 106. Referring to block 814, for a read transaction, this may include reconstructing data (including metadata) associated with the extent using the other storage devices 106 of the group. For example, data and/or parity data is read from the other storage devices 106 and used to recreate the data values. Referring to block 816, to avoid reconstructing this same data again later in the rebuild process, the storage controller 114 may store the reconstructed data to the replacement storage device 106B as described in block 614 of FIG. 6 and may update the change log 304 and/or other tracking log to record that the data has been recreated and stored.

Referring to block 818, for a write transaction, the storage controller may write data and/or parity data associated with the transaction to the other storage devices 106. Referring to block 220, the storage controller records the modified data extents in the change log 304 as described in block 218 of FIG. 2.

Referring to block 820 of FIG. 8, after successfully performing the transaction, whether it is a read or write, the storage controller reports the results of the data transaction to the transaction provider as described in block 220 of FIG. 2. This may include providing data read from the storage devices 106 and/or providing an indicator of a successful write. In some embodiments, the storage controller 114 informs the transaction provider that the data transaction was performed, but that the data may not be protected by the intended amount of redundancy. The technique of blocks 802-820 may be repeated for subsequent data transactions.

Figure 9:
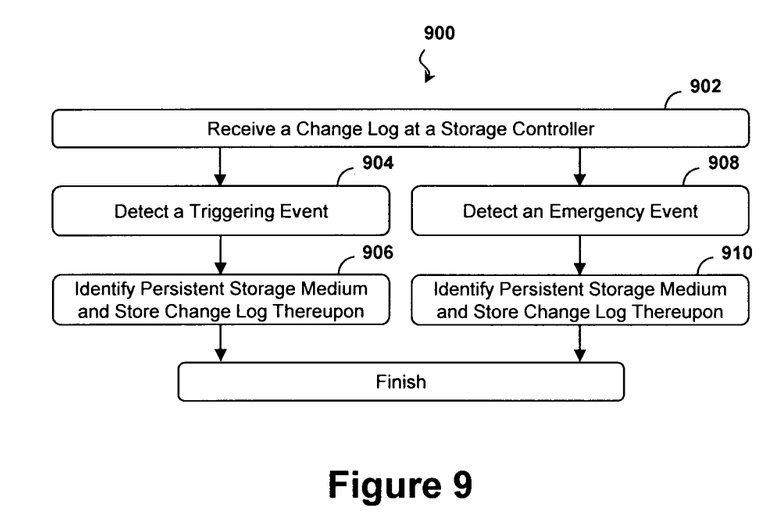
FIG. 9 is a flow diagram of a method of creating a redundant copy of a change log according to aspects of the present disclosure.
Figure 10:
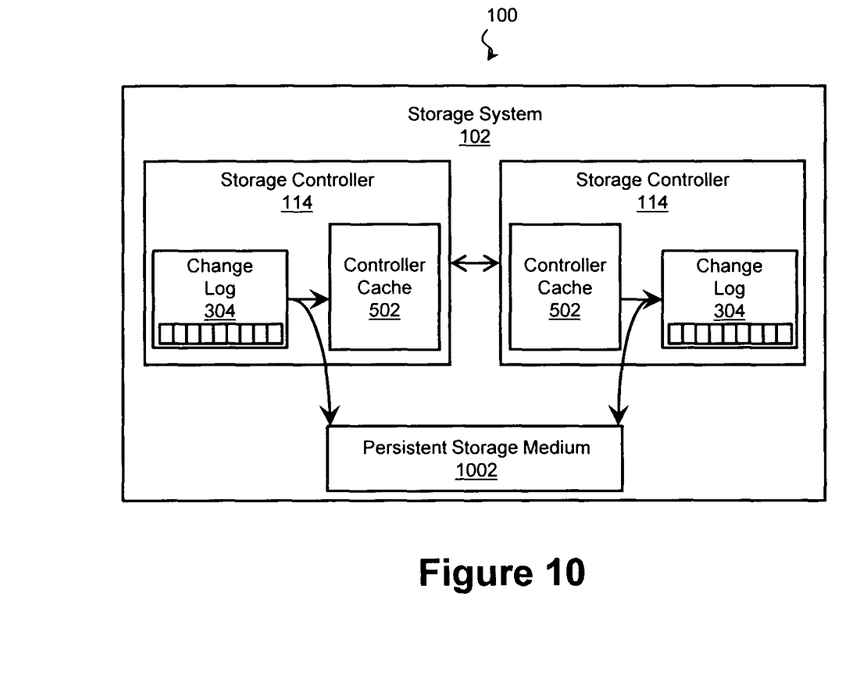
FIG. 10 is a schematic diagram of a computing architecture performing the method according to aspects of the present disclosure.

One of the aforementioned advantages of storing the change log 304 in a storage controller cache 502 is the ability to mirror the change log 304 to other controller caches for redundancy. Additional techniques for safeguarding the change log 304 suitable for incorporation into the methods of the present disclosure are described with respect to FIGS. 9 and 10. FIG. 9 is a flow diagram of a method 900 of creating a redundant copy of a change log 304 according to aspects of the present disclosure. It is understood that additional steps can be provided before, during, and after the steps of method 900, and that some of the steps described can be replaced or eliminated for other embodiments of the method 900. FIG. 10 is a schematic diagram of a computing architecture 100 performing the method 900 according to aspects of the present disclosure. The computing architecture 100 may be substantially similar to the computing architecture 100 of FIGS. 1, 3, 5, and/or 7, and in the interest of brevity, some elements will not be repeated.

Referring to block 902, a change log 304 is received at a storage controller 114 of a storage system. The change log 304 may be substantially similar to the change log of FIGS. 2-8, and in that regard, the receiving of the change log 304 may include the storage controller 114 initializing the change log 304 as described in block 214 of FIG. 2. The storage controller 114 may store the change log 304 to a controller cache 502. Additionally or in the alternative, the storage controller 114 may store a copy of the change log 304 to a persistent memory device 1002, such as battery-backed RAM, flash memory, SSD, HDD, etc., that retains data in the event of an unexpected event. The copy may be made as a preventative measure as shown in blocks 904 and 906 of FIG. 9 and/or as an emergency measure as shown in blocks 908 and 910.

Referring first to block 904, the storage controller 114 may detect a triggering event that indicates a copy of the change log 304 should be made. In various examples, suitable triggering events include an interval of time, the change log 304 exceeding a size threshold, a user command, controller cache 502 occupancy, and/or other suitable event. Referring to block 906 of FIG. 9 and to FIG. 10, the storage controller 114 may select a persistent memory device 1002 based on any suitable criteria including speed, capacity, reliability, durability, Quality-of-Service (QoS), and/or other suitable factors and may store all or part of the change log 304 to the selected memory device 1002.

Referring to block 908, the storage controller may detect an emergency event that indicates that a copy of the change log 304 should be made. Examples of emergency events include power failure, imminent shutdown, a failure detected at the storage controller 114 or another storage controller 114 of the storage system, a loss of a copy of change log 304 at another storage controller, and/or any other emergency. Referring to block 910 of FIG. 9 and to FIG. 10, the storage controller 114 may select a persistent memory device 1002 based on any suitable criteria including speed, capacity, reliability, durability, QoS, and/or other suitable factors and may store all or part of the change log 304 to the selected memory device 1002. In some examples, a battery powers the storage controller 114 and allows it to operate, albeit in a low power mode. This allows the storage controller 114 to flush the contents of the cache including the change log 304 to the persistent memory device in the event of a power failure.

The present embodiments can take the form of an entirely hardware embodiment, an entirely software embodiment, or an embodiment containing both hardware and software elements. Accordingly, it is understood that any operation of the computing systems of the architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include any non-volatile memory including magnetic storage, solid-state storage, optical storage, cache memory, and some types of RAM.

Thus, the present disclosure provides a system and method for managing the loss of a storage device and for rapidly recovering from the event. In some embodiments, the method includes receiving a data transaction directed to a volume and determining that a storage device associated with the volume is inoperable. In response to determining that the storage device is inoperable, a data extent is recorded in a change log in a storage controller cache. The data extent is associated with the data transaction and allocated to the storage device that is inoperable. The data transaction is performed using at least one other storage device associated with the volume, and data allocated to the storage device is subsequently reconstructed using the recorded data extent. In some such embodiments, the method further includes recognizing a replacement storage device of the volume and determining that the replacement storage device corresponds to the storage device that is inoperable. The reconstructing of the data allocated to the storage device is performed based on determining that the replacement storage device corresponds to the storage device that is inoperable, and the reconstructing of the data includes storing the reconstructed data to the replacement storage device. In some such embodiments, determining that the replacement storage device corresponds to the storage device that is inoperable includes verifying that a data set of the replacement storage device corresponds to a data set of the storage device that is inoperable.

In further embodiments, a non-transitory machine-readable medium is provided that has stored thereupon instructions for performing a method of data management. The medium includes machine executable code, which when executed by at least one machine, causes the machine to: receive a data transaction; determine whether a storage device associated with the data transaction is unable to perform the data transaction; upon a determination that the storage device associated with the data transaction is unable to perform the data transaction, initialize a log to record modified data extents; perform the data transaction using at least one other storage device associated with the data transaction; and record a data extent modified by the data transaction in the log. In some such embodiments, the medium includes further machine executable code, which when executed, causes the machine to: identify a replacement storage device; determine whether the replacement storage device corresponds to the storage device that is unable to perform the data transaction; and based upon a determination that the replacement storage device corresponds to the storage device, selectively reconstruct a portion of a dataset based on the log.

In yet further embodiments, the computing device includes a storage controller in communication with at least one storage device and configured to: identify a transaction directed to a volume; based on a determination that a first storage device associated with the volume is inoperable to perform the transaction: record an address of the transaction in a log contained in a storage controller cache; and perform the transaction using a second storage device associated with the volume; use the recorded address to identify data to be stored in a third storage device; and store the identified data in a third storage device. In some such embodiments, the storage controller is further configured to initialize the log based on the determination that the first storage device is inoperable to perform the transaction. In some such embodiments, the storage controller is further configured to use parity information of the second storage device to determine values of the data to be stored in the third storage device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving a data transaction directed to a volume comprising a plurality of storage devices;
   determining that a storage device of the plurality of storage devices is inoperable;
   in response to determining that the storage device is inoperable, recording, in a change log, a data extent that comprises an address range allocated to the inoperable storage device and data that is to be stored at the address range as a result of the data transaction;
   performing the data transaction using at least one other storage device of the plurality of storage devices; and
   subsequently reconstructing data allocated to the storage device using the recorded data extent.

2. The method of claim 1, further comprising:
   recognizing a replacement storage device of the volume; and
   determining that the replacement storage device corresponds to the storage device that is inoperable, and
   wherein the reconstructing of the data further comprises includes storing the reconstructed data to the replacement storage device.

3. The method of claim 2, wherein determining that the replacement storage device corresponds to the storage device that is inoperable further comprises:
   comparing a device identifier of the replacement storage device to a device identifier of the storage device that is inoperable.

4. The method of claim 2, wherein determining that the replacement storage device corresponds to the storage device that is inoperable further comprises:
   verifying that a data set of the replacement storage device corresponds to a data set of the storage device that is inoperable.

5. The method of claim 1, wherein the change log is stored in a first storage controller cache, and the method further comprises:
   maintaining a mirror copy of the change log in a second storage controller cache.

6. The method of claim 5, wherein maintaining the mirror copy further comprises:
   providing a copy of a changed portion of the change log via an inter-controller bus for storing in the second storage controller cache.

7. The method of claim 1, wherein the data transaction is a first data transaction and wherein the reconstructing of the data allocated to the storage device includes storing the reconstructed data to a replacement storage device, the method further comprising:
   receiving a second data transaction during the reconstructing of the data;
   determining, using the change log, whether the second data transaction is directed to data that has not been reconstructed; and
   based on the determining, performing the second data transaction using the replacement storage device during the reconstructing.

8. The method of claim 1, wherein the change log comprises a plurality of data extents that correspond to a plurality of address ranges allocated in the inoperable storage device, one address range per data extent.

9. The method of claim 1, further comprising:
recording, in the change log an indication that the data at the address range of the data extent has been modified by the data transaction.

10. A non-transitory machine-readable medium that has stored thereupon instructions for performing a method of data management, including machine executable code, which when executed by at least one machine, causes the machine to:
receive a data transaction;
determine whether a storage device associated with the data transaction is unable to perform the data transaction;
upon the determination that the storage device associated with the data transaction is unable to perform the data transaction, initialize a log that records modified data extents that comprise address ranges allocated to the storage device and data that is to be stored at the address ranges as a result of the data transaction;
perform the data transaction using at least one other storage device; and
record a data extent modified by the data transaction in the log.

11. The non-transitory machine-readable medium of claim 10, wherein the machine executable code further causes the machine to:
identify a replacement storage device;
determine whether the replacement storage device corresponds to the storage device that is unable to perform the data transaction; and
based upon the determination that the replacement storage device corresponds to the storage device, selectively reconstruct a portion of a dataset based on the log.

12. The non-transitory machine-readable medium of claim 11, wherein the machine executable code that causes the machine to selectively reconstruct the portion of the dataset, further comprises machine executable code that causes the machine to:
match data stored on the replacement storage device with data stored on the storage device that is unable to perform the data transaction.

13. The non-transitory machine-readable medium of claim 11, wherein the machine executable code that causes the machine to selectively reconstruct the portion of the dataset further comprises machine executable code that causes the machine to:
correspond an identifier of the replacement storage device to an identifier of the storage device that is unable to perform the data transaction.

14. The non-transitory machine-readable medium of claim 11, wherein the data transaction is a first data transaction and wherein the machine executable code further causes the machine to:
receive a second data transaction during the selective reconstruction; and
based on a determination that the second transaction is directed to a reconstructed portion of the dataset, perform the second transaction using the replacement storage device during the selective reconstruction.

15. The non-transitory machine-readable medium of claim 11, wherein the data transaction is a first data transaction and wherein the machine executable code further causes the machine to:
receive a second data transaction during the selective reconstruction; and
based on a determination that the second transaction is directed to a portion of the dataset that has not been reconstructed:
perform the second data transaction using the at least one other storage device; and
record a data extent modified by the second data transaction in the log.

16. A computing device comprising:
a storage controller in communication with at least one storage device and configured to:
identify a transaction directed to a volume;
determine that a first storage device of a plurality of storage devices associated with the volume is inoperable to perform the transaction; and
based on the determination:
record, in a log an address allocated to the first storage device and data that is to be stored at the address and that has been modified by the transaction;
perform the transaction using a second storage device of the plurality of storage devices associated with the volume;
use the recorded address to identify the data to be stored in a third storage device; and
store the identified data in a third storage device.

17. The computing device of claim 16, wherein the storage controller is further configured to initialize the log in a storage controller cache based on the determination that the first storage device is inoperable to perform the transaction.

18. The computing device of claim 16, wherein the storage controller is further configured to:
determine that a dataset of the third storage device corresponds to a dataset of the first storage device; and
identify, using the recorded address, the data to be stored in the third storage device.

19. The computing device of claim 16, wherein the storage controller is further configured to:
determine that an identifier of the third storage device corresponds to an identifier of the first storage device; and
identify, using the recorded address the data to be stored in the third storage device.

20. The computing device of claim 16, wherein the log is stored in a first storage controller cache, and wherein the storage controller is further configured to maintain a copy of the log in a second storage controller cache.

21. The computing device of claim 16, wherein the storage controller is further configured to use parity information of the second storage device to determine values of the data to be stored in the third storage device.

* * * * *